United States Patent
Rabinovich et al.

(10) Patent No.: US 9,120,696 B2
(45) Date of Patent: *Sep. 1, 2015

(54) METHODS FOR IMPROVING PERFORMANCE OF HOLOGRAPHIC GLASSES

(71) Applicant: PD-LD, Inc., Pennington, NJ (US)

(72) Inventors: Eliezer M. Rabinovich, Berkeley Heights, NJ (US); Boris L. Volodin, Pennington, NJ (US); Vladimir S. Ban, Princeton, NJ (US); Elena D. Melnik, Lawrenceville, NJ (US)

(73) Assignee: PD-LD, INC., Pennington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,452

(22) Filed: May 7, 2013

(65) Prior Publication Data

US 2013/0240803 A1    Sep. 19, 2013

Related U.S. Application Data

(63) Continuation of application No. 12/111,090, filed on Apr. 28, 2008, now Pat. No. 8,455,157.

(60) Provisional application No. 60/914,052, filed on Apr. 26, 2007.

(51) Int. Cl.
*G03H 1/02* (2006.01)
*C03C 4/04* (2006.01)
(Continued)

(52) U.S. Cl.
CPC ... *C03C 4/04* (2013.01); *C03C 3/04* (2013.01); *C03C 3/112* (2013.01); *G03H 1/0248* (2013.01); *G03H 2001/0268* (2013.01); *G03H 2001/2271* (2013.01); *G03H 2260/54* (2013.01)

(58) Field of Classification Search
CPC ............ C03C 4/04; C03C 3/04; C03C 3/112; G03H 1/0248; G03H 2001/2271; G03H 2001/0268; G03H 2260/54
See application file for complete search history.

(56) References Cited

U.S. PATENT DOCUMENTS 3,396,343 A    8/1968  Gustaaf ..................... 372/107
3,580,657 A    5/1971  Sheridon
(Continued)

FOREIGN PATENT DOCUMENTS

EP    0 310 438 A1    4/1989
EP    0 322 218 A3    6/1989
(Continued)

OTHER PUBLICATIONS

Kuchinskii et al., "Properties of Volume phase holograms on polychromic glasses", Opt. Spektrosk. vol. 70(6) pp. 1296-1300 (1991).*

(Continued)

*Primary Examiner* — Martin Angebranndt
(74) *Attorney, Agent, or Firm* — Condo Roccia Koptiw LLP

(57) ABSTRACT

The improvement of the performance of holographic glasses with recorded holograms as measured by a figure of merit of the holographic glasses is disclosed. The improvement in the figure of merit of the holographic glasses is obtained at least in part with the addition of arsenic in the formation of the holographic glasses. The presence of arsenic increases the figure of merit as measured at a wavelength of interest of a holographic glass with a recorded hologram as compared to a holographic glass with a recorded hologram that does not contain arsenic.

7 Claims, 8 Drawing Sheets

| Constituent | Weight % glass | Weight % glass | |
|---|---|---|---|
| | | narrow range | wide range |
| Silver | 0.0400 | 0.02-0.1 | 0.01-0.2 |
| Aluminum Oxide | 4.8001 | 3.0-6.0 | 2.0-10.0 |
| Arsenic Oxide(s) | 0.1375 | 0.05-0.2 | 0.02-0.4 |
| Bromine | 1.0000 | 0.5-1.5 | 0.2-2.0 |
| Cerium Oxide(s) | 0.0500 | 0.03-0.1 | 0.01-0.2 |
| Fluorine | 2.3001 | 1.5-2.7 | 1.0-3.0 |
| Potassium Oxide | 0.5900 | 0.3-1.0 | 0.1-2.0 |
| Sodium Oxide | 15.8404 | 12.0-20.0 | 10.0-25.0 |
| Silicon Oxide | 68.4217 | 65.0-70.0 | 55-75 |
| Tin Oxide(s) | 0.0100 | 0.005-0.02 | 0.001-0.1 |
| Zinc Oxide | 6.8102 | 5.0-10.0 | 3.0-15.0 |
| TOTAL OXIDES | 100.0000 | | |

(51) Int. Cl.
*C03C 3/112* (2006.01)
*C03C 3/04* (2006.01)
*G03H 1/22* (2006.01)

(56) References Cited

U.S. PATENT DOCUMENTS

| | | | | |
|---|---|---|---|---|
| 3,603,690 | A | 9/1971 | Hard | 356/521 |
| 3,647,289 | A | 3/1972 | Weber | |
| 3,936,143 | A | 2/1976 | Sato | 350/96 C |
| 4,013,338 | A | 3/1977 | Sato et al. | |
| 4,017,318 | A * | 4/1977 | Pierson et al. | 501/13 |
| 4,057,408 | A | 11/1977 | Pierson et al. | 65/18 |
| 4,095,875 | A | 6/1978 | Lee et al. | 350/320 |
| 4,125,404 | A * | 11/1978 | Araujo et al. | 501/13 |
| 4,215,937 | A | 8/1980 | Borsuk | 356/73.1 |
| 4,239,333 | A | 12/1980 | Dakss et al. | 350/96.21 |
| 4,398,797 | A | 8/1983 | Wedertz et al. | 385/137 |
| 4,549,894 | A * | 10/1985 | Araujo et al. | 65/30.11 |
| 4,747,657 | A | 5/1988 | Chaoui et al. | 350/96.2 |
| 4,942,102 | A | 7/1990 | Keys et al. | 430/1 |
| 4,943,126 | A | 7/1990 | Lang et al. | 359/12 |
| 5,115,338 | A | 5/1992 | DiGiovanni et al. | 359/337 |
| 5,335,098 | A | 8/1994 | Leyva et al. | 359/7 |
| 5,440,669 | A | 8/1995 | Rakuljic et al. | 359/7 |
| 5,452,124 | A | 9/1995 | Baker | 359/341.2 |
| 5,491,570 | A | 2/1996 | Rakuljic et al. | 359/7 |
| 5,548,676 | A | 8/1996 | Savage | 385/92 |
| 5,619,609 | A | 4/1997 | Pan et al. | 385/136 |
| 5,655,040 | A | 8/1997 | Chesnoy et al. | 385/37 |
| 5,684,611 | A | 11/1997 | Rakuljic et al. | 359/7 |
| 5,691,989 | A | 11/1997 | Rakuljic et al. | 372/20 |
| 5,777,763 | A | 7/1998 | Tomlinson, III | 359/130 |
| 5,796,096 | A | 8/1998 | Rakuljic et al. | 250/226 |
| 5,798,859 | A | 8/1998 | Colbourne et al. | 359/247 |
| 5,812,258 | A | 9/1998 | Pierson | 356/317 |
| 5,825,792 | A | 10/1998 | Villeneuve et al. | 372/32 |
| 6,055,250 | A | 4/2000 | Doerr et al. | 372/23 |
| 6,064,685 | A | 5/2000 | Bissessur et al. | |
| 6,093,927 | A | 7/2000 | Wickham | 250/227.23 |
| 6,122,043 | A | 9/2000 | Barley | 356/73.1 |
| 6,184,987 | B1 | 2/2001 | Jang et al. | 356/384 |
| 6,198,759 | B1 | 3/2001 | Broderick et al. | 372/39 |
| 6,249,624 | B1 | 6/2001 | Putnam et al. | 385/37 |
| 6,269,203 | B1 | 7/2001 | Davies et al. | 385/24 |
| 6,285,813 | B1 | 9/2001 | Schultz et al. | 385/37 |
| 6,385,219 | B1 | 5/2002 | Sonoda | 372/28 |
| 6,414,973 | B1 | 7/2002 | Hwu et al. | 372/19 |
| 6,434,175 | B1 | 8/2002 | Zah | 372/20 |
| 6,470,120 | B2 | 10/2002 | Greene et al. | 385/52 |
| 6,524,913 | B1 | 2/2003 | Lin et al. | |
| 6,529,675 | B1 | 3/2003 | Hayden et al. | 385/141 |
| 6,580,850 | B1 | 6/2003 | Kazarinov et al. | 385/28 |
| 6,673,493 | B2 | 1/2004 | Gan et al. | 429/233 |
| 6,829,067 | B2 | 12/2004 | Psaltis et al. | 359/15 |
| 7,031,573 | B2 | 4/2006 | Volodin et al. | 385/37 |
| 7,184,616 | B2 | 2/2007 | Mead et al. | 385/10 |
| 7,248,617 | B2 | 7/2007 | Volodin et al. | 372/102 |
| 8,455,157 | B1 * | 6/2013 | Rabinovich et al. | 430/1 |
| 2001/0016099 | A1 | 8/2001 | Shin et al. | 385/37 |
| 2001/0028483 | A1 | 10/2001 | Buse | 359/15 |
| 2002/0012377 | A1 | 1/2002 | Suganuma et al. | 372/98 |
| 2002/0045104 | A1 | 4/2002 | Efimov et al. | 430/2 |
| 2002/0176126 | A1 | 11/2002 | Psaltis et al. | 359/15 |
| 2002/0192849 | A1 | 12/2002 | Bullington et al. | 438/22 |
| 2003/0174749 | A1 | 9/2003 | Capasso et al. | 372/45 |
| 2003/0214700 | A1 | 11/2003 | Sidorin et al. | 359/334 |
| 2005/0018743 | A1 | 1/2005 | Volodin et al. | |
| 2005/0207466 | A1 | 9/2005 | Glebov et al. | 372/92 |
| 2006/0029120 | A1 | 2/2006 | Mooradian et al. | 372/102 |
| 2006/0123344 | A1 | 6/2006 | Volkov et al. | |
| 2006/0156241 | A1 | 7/2006 | Psaltis et al. | 715/730 |
| 2006/0256827 | A1 | 11/2006 | Volodin et al. | 370/50.121 |

FOREIGN PATENT DOCUMENTS

| | | |
|---|---|---|
| JP | 4287001 | 10/1992 |
| SU | 724465 * | 3/1980 |
| WO | WO 03/036766 A2 | 5/2003 |

OTHER PUBLICATIONS

Glebov et al., "New ways to use photosensitive glasses for recording volume phase holograms", *Opt. Spektrosk.*, vol. 72 pp. 404-412 (Aug. 1992).*

Borgman, V.A., et al., "Photothermal refractive effect in silicate glasses," *Sov. Phys. Dokl.*, Nov. 1989, 1011-1013.

Borrelli, N.F., et al., "Photosensitive glasses and glass-ceramics," *Glass Processing*, 439-444.

Breer, S., et al., "Low-crosstalk WDM by bragg diffraction from thermally fixed reflection holograms in lithium niobate," *Electronics Letts.*, 1998, 34(25), 2419-2421.

Churin, E.G., et al., "Design of free-space WDM router based on holographic concave grating," *IEEE Photonics Techn. Letts.*, Feb. 1999, 11(2), 221-223.

Dicing Solutions for DWDM optical filter applications; advertising brochure of *ADT Advanced Dicing Technologies*, Stockholm, Sweden, 2003, 2 pages.

Efimov, O.M., et al., "High-efficiency bragg gratings in photothermorefractive glass," *Applied Optics*, Feb. 1, 1999, 38(4), 619-627.

Glebov, L.B., et al., "Pholychromic glasses-a new material for recording volume phase holograms," *Sov. Phys. Dokl.*, Oct. 1990, 35(10), 878-880.

Glebov, L.B., "High-efficiency volume hologram recording in silicate glass," *School of Optics and CREOL*, University of Central Florida, Orlando, FL, 16 pages.

Glebov, L.B., "Photosensitive glass for phase hologram recording," *Glass Science and Technology*, 1998, 71C, 85-90.

Hendow, S.T., "Crystal bragg gratings stabilize laser sources," *Laser Focus World*, Nov. 1996, S19-S24.

Kogelnik, H., et al., "Coupled wave theory for thick hologram gratings," *The Bell System Technical Journal*, Nov. 1969, 48(9), 2909-2947.

Liu, J., et al., "Modeling and design of planar slanted volume holographic gratings for wavelength-division-multiplexing applications," *Applied Optics*, Dec. 1, 1999, 6981-6986.

Moslehi, B., et al., "Fiber-optic wavelength-division multiplexing and demultiplexing using volume holographic gratings," *Optics Letters*, Oct. 1, 1989, 1088-1090.

Optical Interference Filters, 17th Ed., *Spectrogon*, Taby, Sweden, www.spectrogen.com, (no date available), 3-21.

Qiao, J., et al., "Dispersion-enhanced volume hologram for dense wavelength-division demultiplexer," *IEEE Photonics Technology Letts.*, Aug. 2000, 12(8), 1070-1072.

Rakuljic, G.A., et al., "Volume holographic narrow-band optical filter," *Optical Engineering*, Oct. 1997, 36(10), 459-461.

Sayano, K., "Holographic grating filters in optical glasses for C31 WDM networks," *Accuwave Corp., sponsored by Ballistic Missile Defense Organization*, May 1998, AFRL-SN-RS-TR-1998-81, Final Technical Report, 1-35, DL-1-DL-3.

Timofeev, F.N., et al., "Free-space grating multi/demultiplexer and wavelength-router for densely spaced WDM networks," *IEE*, 1997, 11/1-11/5, 372-373.

Zhao, F., et al., "Reliable grating-based wavelength division (de)multiplexers for optical networks," *Opt. Eng.*, Jul. 2001, 40(7), 1204-1211.

Zhao, F., et al., "Subpicometer accuracy laser wavelength sensor using multiplexed bragg gratings," *IEEE Photonics Technology Letts.*, Nov. 1997, 9(11), 1493-1495.

Zhao, F., et al., "Ultraviolet Ca K-line narrow-bandwidth imaging filters based on holographic Bragg gratings in photorefractive materials," *Opt. Eng.*, Oct. 1997, 36(10), 2918-2921.

Dmitriyev, A.L., et al., "Volume holograms in the optical devices of optical-fiber data transmission systems, A review," *Telecommun. & Radio Eng.*, 1995, 49(12), 9-15.

(56) References Cited

OTHER PUBLICATIONS

Sayano, K., et al., "Modular WDM add/drop multiplexers," *SPIE*, 1997, 3234, 102-107.

Chang-Hasnain, C.J., et al., "High power with high efficiency in a narrow single-lobed beam from a diode laser array in an external cavity," *Appl. Phys. Lett.*, 1987, 50(21), 1465-1467.

Datta, S., et al., "Modeling of nonideal volume Bragg reflection gratings in photosensitive glass using a perturbed transmission matrix approach," *IEEE J. of Quantum Electronics*, 2004, 40(5), 580-590.

Goodman, J.W., "Introduction to Fourier Optics," *McGraw-Hill Co., Inc.*, 2nd Ed., 1996, 329-330.

Moser, C., et al., "Volume Bragg grating devices," *Friday Morning*, 2003, 2, 644-645.

Sakamoto, M., et al., "20 W CW monolithic AIGaAs (810nm) laser diode arrays," *Electronic Letts.*, 1992, 28(2), 178-180.

Volodin, B.L., et al., "High-resolution compact imaging holographic Bragg grating spectrometer," *CLEO*, 1998, 401-402.

Yiou, S., et al., "Improvement of the spatial beam quality of laser sources with an intracavity Bragg grating," *Optics Letts.*, 2003, 28(4), 242-244.

Jannson, T. et al., "Lippmann-Bragg Broadband Holographic Mirrors", *J. of the Optical Soc. of Am.*, 1991, 8(1), 201-211.

Loiseaux, B, et al., "Characterization of Perpindicular Chirped Phase Volume Grating Pairs for Laser Stretching", *Optic Letters*, OSA, 1996, 21(11), 806-808.

Efimov, O.M. et al., "Diffractive Optical Elements in Photosensitive Inorganic Glasses", Proceedings of the SPIE Inorganic Materials III, Aug. 2001, 4452, 39-47.

Harrison, J. et al., "Coherent Summation of Injection-Locked, Diode-Pumped Nd: YAG Ring Lasers", *Optics Letters*, Feb. 1998, 13(2), 111-113.

Kozlov, V.A. et al., "All-Fiber Coherent Beam Combining of Fiber Lasers", *Optic Letters*, Dec. 15, 1999, 24(24), 1814-1816.

Leger, J.R. et al., "Efficient Side Lobe Suppression of Laser Diode Arrays", *Appl. Phys. Lett.*, 1987, 50(16), 1044-1046.

Leger, J.R. et al., "Coherent Beam Addition of GaAiAs Lasers by Binary Phase Gratings", *Appl. Phys. Lett.*, Apr. 1986, 48(14), 888-890.

Leger, J.R. et al., "Coherent Laser Addition Using Binary Phase Gratings", *Applied Optics*, 1987, 26(20), 4391-4399.

Menard, S. et al., "Highly Efficient Phase Locking and Extracavity Coherent Combination of Two Diode-Pumped Nd: YAG Laser Beams", *Optics Letters*, Dec. 15, 1996, 21(24), 1996-1998.

Rodgers, B.C. et al., "Laser Beam Combining and Cleanup by Stimulated Brillouin Scattering in a Multimode Optical Fiber", *Optics Letters*, Aug. 15, 1999, 24(16), 1124-1126.

Swanson, G.J. et al., "Aperture Filling of Phase-Locked Laser Arrays", *Optics Letters*, Apr. 1987, 12(4), 245-247.

Veldkamp, W. B. et al., "Coherent Summation of Laser Beams Using Binary Phase Gratings", *Optics Letters*, May 1986, 11(5), 303-306.

Mills, P., "Single-Mode Operation of 1.55 µm Semiconductor Lasers Using a Volume holographic Grating", *Electronic Letters*, Jul. 1985, 21(15), 648-649.

In the United States District Court for the District of New Jersey, *PD-LD, Inc.*, v. *Ondax, Inc.*, Case No. 08-cv-03494, DRAFT Amended Answer to Complaint; Affirmative Defenses; Counterclaims and Jury Demand, Sep. 18, 2008, 34 pages.

In the United States District Court for the District of New Jersey, *PD-LD, Inc.*, v. *Ondax, Inc.*, Case No. 08-cv-03494, Initial Disclosures of Defendant Ondax, Inc. Pursuant to FRCP 26(a)(1), Sep. 12, 2008, 10 pages.

In the United States District Court for the District of New Jersey, *PD-LD, Inc.*, v. *Ondax, Inc.*, Case No. 08-cv-03494, Third Party Complaint by Defendant Ondax, Inc. Against Arasor International Limited and Jury Demand, Aug. 22, 2008, 9 pages.

In the United States District Court for the District of New Jersey, *PD-LD, Inc.*, v. *Ondax, Inc.*, Case No. 08-cv-03494, Answer to Complaint: Affirmative Defenses; Counterclaims and Jury Demand, Aug. 13, 2008, 31 pages.

U.S. Appl. No. 10/390,521, Jul. 3, 2003, Volodin, et al.

\* cited by examiner

| Raw materials | Weight % |
|---|---|
| AgNO$_3$ | 0.0508 |
| Al$_2$O$_3$ | 3.8692 |
| As$_2$O$_3$ | 0.1106 |
| NaBr | 1.0399 |
| CeO$_2$ | 0.0403 |
| Na$_2$SiF$_6$ | 3.0600 |
| K$_2$CO$_3$ | 0.6994 |
| NaNO$_3$ | 31.3097 |
| SiO$_2$ | 54.3258 |
| SnO | 0.0081 |
| ZnO | 5.4863 |
| Total | 100.0000 |

Figure 2A

| Raw materials | Weight % |
|---|---|
| AgNO$_3$ | 0.0525 |
| Al$_2$O$_3$ | 3.9998 |
| As$_2$O$_3$ | 0.1146 |
| KBr | 1.2395 |
| CeO$_2$ | 0.0417 |
| NaF | 4.2367 |
| NaNO$_3$ | 27.6179 |
| SiO$_2$ | 57.0143 |
| SnO | 0.0083 |
| ZnO | 5.6748 |
| Total | 100.0000 |

Figure 2B

| Constituent | Weight % glass | Weight % glass | |
|---|---|---|---|
| | | narrow range | wide range |
| Silver | 0.0400 | 0.02-0.1 | 0.01-0.2 |
| Aluminum Oxide | 4.8001 | 3.0-6.0 | 2.0-10.0 |
| Arsenic Oxide(s) | 0.1375 | 0.05-0.2 | 0.02-0.4 |
| Bromine | 1.0000 | 0.5-1.5 | 0.2-2.0 |
| Cerium Oxide(s) | 0.0500 | 0.03-0.1 | 0.01-0.2 |
| Fluorine | 2.3001 | 1.5-2.7 | 1.0-3.0 |
| Potassium Oxide | 0.5900 | 0.3-1.0 | 0.1-2.0 |
| Sodium Oxide | 15.8404 | 12.0-20.0 | 10.0-25.0 |
| Silicon Oxide | 68.4217 | 65.0-70.0 | 55-75 |
| Tin Oxide(s) | 0.0130 | 0.005-0.02 | 0.001-0.1 |
| Zinc Oxide | 6.8102 | 5.0-10.0 | 3.0-15.0 |
| TOTAL OXIDES | 100.0000 | | |

Figure 3

| Wavelength (nm) | Maximum FOM Prior art glass (um) | Typical FOM Modified glass (um) |
|---|---|---|
| Blue (473 nm) | 6 | 10 |
| Green (532 nm) | 10 | 16 |
| Red (633 nm) | 19 | > 30 |

Figure 5

METHODS FOR IMPROVING PERFORMANCE OF HOLOGRAPHIC GLASSES

CROSS-REFERENCE TO RELATED APPLICATIONS

This application is a continuation of U.S. patent application Ser. No. 12/111,090, filed Apr. 28, 2008, which claims benefit under 35 U.S.C. §119(e) of provisional U.S. patent application No. 60/914,052, filed Apr. 26, 2007, the entirety of which is incorporated herein by reference.

BACKGROUND

Glasses that are capable of producing changes in color are sometimes referred to as "polychromatic" glasses. Glasses that are capable of producing refractive index modulation upon illumination by light, followed by thermal treatment, are sometimes referred to as "photorefractive" or "photo-thermal-refractive" (PTR) glasses. Such glasses are well known, and may be referred to generally herein as "holographic" glasses. Examples of such holographic glasses have been disclosed in, for example, U.S. Pat. No. 4,017,318 ("Pierson"), U.S. Pat. No. 4,514,053 ("Borrelli"), U.S. Pat. No. 6,586,141 ("Efimov"), and Soviet patent SU 1,780,429 ("Borgman"). The entire disclosures of each of the foregoing patents are incorporated herein by reference.

A characteristic of a holographic glass is the optical performance, in a very general sense, of the glass at a certain frequency or wavelength of light, or over a range of frequencies or wavelengths of light, before and after a hologram has been recorded in the glass. The performance of such a holographic glass may be measured by a so-called "figure of merit" (FOM). For better optical performance, it may be desirable to increase the FOM of holographic glasses.

SUMMARY

It has been discovered that the introduction of arsenic into a holographic glass composition increases the performance of the holographic glass, at least in the visible and ultraviolet spectra. Such performance improvement may be demonstrated by an increase in the figure of merit (FOM) of the glass. FOM may be measured as a ratio of the change in the index of refraction of the holographic glass to the light loss of the glass at a predetermined test light wavelength after a Bragg grating is holographically recorded in the glass. Arsenic may be introduced into the glass composition during the manufacturing process in the form of an arsenic compound, such as $As_2O_3$, for example.

BRIEF DESCRIPTION OF THE DRAWINGS

FIGS. 2A and 2B are illustrative examples of raw material schedules for holographic glass that contain an arsenic compound.

FIG. 3 is an illustrative example of a range of components of a holographic glass produced from illustrative methods and the raw materials illustrated in FIGS. 2A and 2B.

FIG. 5 is a listing of the figures of merit for an example holographic glass made with an arsenic compound, at various wavelengths of interest.

DETAILED DESCRIPTION OF ILLUSTRATIVE EMBODIMENTS

Figure 1:
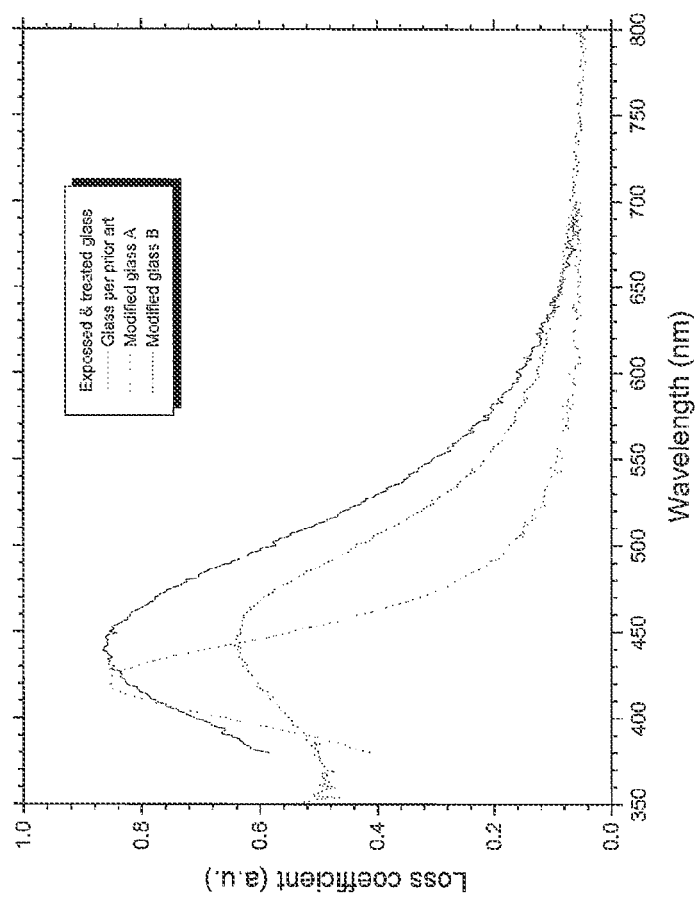
FIG. 1 is a plot of absolute loss coefficient measured in certain holographic glasses.

FIGS. 2A and 2B provide example tables of raw materials that may be used in the formation of such holographic glasses. The tables provide lists of raw materials, along with the percentage by weight of each, for two example formulations. In both formulations, arsenic may be supplied in the form of $As_2O_3$. In the first example, provided in FIG. 2A, the $As_2O_3$ may make up 0.1106% of the total combined weight of all the input ingredients. In the second example, provided in FIG. 2B, the $As_2O_3$ may make up 0.1146% of the total combined weight of all the input ingredients. Though the example formulations provided herein introduce arsenic in the form of $As_2O_3$, it should be understood that other oxides of arsenic could be used, and that the arsenic could be supplied in elemental form. It should also be understood that the specific combinations of ingredients, as well as the relative proportions of the ingredients in each formulation, are provided for illustrative purposes only. Any desirable combination of ingredients may be used, in combination with arsenic or an arsenic compound, in any desirable proportions, to form a holographic glass containing arsenic.

Holographic glasses containing arsenic may be produced using any of a number of known methods. Such methods are well known to those skilled in the art, and need not be described herein in detail. However, a summary method for forming a holographic glass is provided for context.

According to one such method, a batch of raw materials, such as those listed in FIG. 2A or 2B, for example, may be combined and mixed in a blender that is suitable for such purposes. An initial volume of the blended raw materials may be loaded (or "charged") into a crucible, which may be made of quartz, alumina, or platinum, for example.

The crucible containing the blended raw materials may be placed into a furnace. The temperature of the furnace may be raised gradually, according to a desired schedule, to a desired maximum temperature. Additional volumes of the blended raw materials may be added to the crucible as the temperature rises, in an effort to keep the crucible filled to a certain level. The contents of the crucible may form a so-called glass "melt."

The glass melt may be "fined" by maintaining the melt at a desired temperature and stirring it. The melt may be cooled in the furnace to a desired casting temperature. The cooled melt may be cast directly from the furnace or removed from the furnace and cast out according to a known procedure.

The glass may be annealed by maintaining the glass near the glass transition temperature for a period of several hours, and then gradually cooling the glass to room temperature to relieve stress. The cooled glass may be cut into wafers of a desired size, lapped, and polished. The finished glass is a holographic glass in which a Bragg grating, or other hologram, can be optically recorded.

FIG. 3 provides a table listing the constituents of example holographic glasses made according to the foregoing method, using combinations of raw materials such as those provided in FIGS. 2A and 2B. As described herein, the finished glass may contain arsenic. The arsenic may be present as one or more arsenic oxides, such as $As_2O_3$ and/or $As_2O_5$.

The table of FIG. 3 provides an example ratio of the weight of each constituent to the total weight of the finished glass, given as a percentage of the total weight of the finished glass. For example, such a glass may contain 0.1375% by weight of one or more arsenic oxides. The table also provides relatively narrow and relatively broad tolerances by weight for each constituent. For example, it might be tolerable for such a glass to contain anywhere from 0.05 to 0.2% by weight of one or more arsenic oxides. It might be tolerable for such a glass to contain anywhere from 0.02 to 0.4% by weight of one or more arsenic oxides.

Such holographic glasses may be used in the formation of optical elements. Such an optical element may include a Bragg grating, for example, holographically recorded in a three-dimensional bulk of a holographic glass. Such an optical element may be referred to as a volume Bragg grating (or "VBG") element. Properties of VBG elements, methods for making and using VBG elements, and optical systems employing VBG elements have been described and claimed in U.S. Pat. Nos. 7,125,632 and 7,298,771, for example. The entire disclosure of each of U.S. Pat. Nos. 7,125,632 and 7,298,771 is incorporated herein by reference.

Methods by which photo-induced images or phase holograms, for example, are recorded in a three-dimensional bulk of holographic glass generally include two distinct steps. First, the bulk is exposed to light, whereby photo-induced changes of the material properties of the bulk are initiated. Then, the bulk is subjected to thermal treatment, whereby changes in color and refractive index of the material are completed.

Accordingly, two types of physical changes may occur in the holographic glass before a phase hologram is formed. First, a certain amount of nano-clusters of metallic colloid phase may form in the glass. Second, small alkali-halide crystals of predominantly sodium fluoride may grow on these nano-clusters to reach a combined volume sufficient to induce the required refractive index changes in the exposed areas of glass.

The first type of physical change, i.e., the formation of nano-clusters (of metallic silver, preferably), manifests itself in the appearance of characteristic absorption features, which may lead to yellow or tan color hue of glass. FIG. 1 depicts an absorption band centered near 450 nm.

The second type of physical changes, growth of alkali-halide crystals inside the amorphous matrix of glass, may occur in the form of nano-crystals scattered in the volume of glass. The difference in the index of refraction in the exposed areas compared with unexposed area may be determined by the total volume of a second phase formed inside the glass matrix:

$$\Delta n = (n_c - n_g) N \frac{4\pi}{3} r^3(t) \quad (1)$$

where $n_c$ is the refractive index of the crystalline phase, $n_g$ is the refractive index of the glass matrix, N is the concentration of the nano-crystals of the second phase, and r is the average radius of such a crystal. Crystals of non-spherical shapes may form.

The crystals of the second phase may also become scattering centers for the light propagating inside the glass. The scattering loss coefficient $\alpha_{sc}$ produced by such a distribution of nano-clusters can be estimated according to the Raleigh scattering formula:

$$\alpha_{sc} = N \sigma_{sc} = N \cdot const \cdot \frac{r^6(t)}{\lambda^4} \quad (2)$$

where $\sigma_{sc}$ is the scattering cross section, and $\lambda$ is the wavelength of scattered light. There may be two distinct mechanisms of optical loss in the holographic glasses: absorption by the metal nano-clusters (or metal colloid), and scattering by the dispersed crystalline phase. Consequently, the process of a phase hologram formation may be accompanied by an increase in loss (or a decrease in transparency) of the material.

To describe the performance of holographic glasses with recorded holograms for various wavelengths of test light, it is useful to use a figure of merit (FOM) that may describe the balance between the achieved contrast of the recorded hologram (characterized by the induced change in the refractive index) and the accompanying optical loss in the material. The FOM may be defined as the ratio between the induced refractive index modulation and the total loss coefficient of the material at a specific wavelength:

$$FOM = \frac{\Delta n}{\alpha_{sc} + \alpha_{abs}} \quad (3)$$

where $\alpha_{sc}$ and $\alpha_{abs}$ are the scattering and absorption coefficients of the material at a specific wavelength, respectively. Note that the FOM defined by equation (3) has the dimensionality of length, and may be expressed in microns.

The FOM may be influenced by the amount of time that the holographic glass material spends in the thermal treatment cycle. Since at the early stages of the thermal treatment cycle the absorption characteristic may exist already but not the induced refractive index $\Delta n$, the FOM may start out small and increase up to a certain point. However, because the scattering coefficient $\alpha_{sc}$ grows significantly faster with the size of the crystallites than $\Delta n$ (see Eqs. (1) and (2)), the FOM eventually declines during the continued thermal treatment cycle. Therefore, the FOM should reach its maximum at some point during the growth of the hologram or VBG element. The maximum FOM is determined according to the theory discussed above:

$$FOM_{max} = A \cdot \lambda^2 \cdot \sqrt{\frac{\varepsilon(E)}{\sigma_{abs}(\lambda, E)}} \quad (4)$$

where $\varepsilon(E)$ is the fraction of colloidal particles that initiate nucleation of the crystalline phase, and $\sigma_{abs}(\lambda, E)$ is the characteristic absorption cross section of the colloidal particles. Minimizing the absorption cross-section and maximizing the quantity $\varepsilon(E)$ may be important means of improving transparency of phase holograms, particularly in the "soft" UV and visible spectral regions.

Trace element dopants that affect surface energy of metal colloidal particles inside the glass matrix may lead to the dissolution of these nano-clusters during the thermal treatment cycle and, therefore, increase the FOM of glass by reducing the effective absorption cross section (Eq. 4). Therefore, any elements that are likely to interact with the metal colloid particles and alter their surface energy can potentially improve the FOM of holographic glasses. It has been found, for example, that the addition of arsenic to the glass composition shows evidence of such behavior (see FIG. 7).

In general, dopants that are likely to increase the FOM of holographic glass will typically exhibit some or all of the following properties. First, they may affect the oxidation/reduction behavior of silver or other colloid-forming metals (e.g., copper or gold) in the glass matrix during and immediately after the light exposure and during the thermal treatment cycle. They may facilitate formation of the nuclei of sodium fluoride (or other alkali-halide crystals) on the colloidal particles of silver or other metals. They may facilitate dissolution of the metal colloid at later stages of the thermal treatment cycle. And they may help to control the size distribution of the metal colloid in the glass matrix.

The addition of a dopant such as arsenic has been demonstrated to play an intimate role in the process of photo-induced phase hologram formation in such glasses. The data shows that significant improvement in the FOM of holographic glasses may occur upon addition of such a dopant.

As is shown in Eq. (4), the maximum FOM of glass is determined by the absorption cross-section of the metal colloidal particles and also by the fraction of the number of these particles that become nucleation centers of the crystalline phase. Note that Eq. (4) assumes that all the absorbing centers survive throughout the thermal annealing process. Since absorption cross section of colloidal phase of silver, for example, depends on the size and shape of the cluster, the position of the absorption maximum and the width of absorption peak are indicators of the change in the absorption cross-section. Such changes have not been seen to correspond to the presence or absence of trace element dopants alone. Therefore, the primary explanation for the role of these agents may be their affect on the fraction of the number of colloidal particles that become nucleation centers of the crystalline phase. A secondary explanation is their possible effect on dissolution of the colloidal particles at later stages of thermal treatment when the nuclei of the crystalline phase have formed already. (See FIG. 7).

Hologram optical performance, and thus the FOM, may be influenced by the size, shape, and volume concentration of the metal colloid inside the glass matrix, and also by the size and volume concentration of the nano-crystallites of the second phase. Control over these properties may be exercised via a number of parameters: concentration of silver (or copper, or gold) in the glass matrix, the oxidation level of the glass, the exposure to light, and concentrations of arsenic in the glass matrix, for example. As a result, absorption features of the metal colloid may be altered significantly. Nevertheless, it may be easy to understand that in order to serve as nucleation centers for the growth of the crystalline phase, the metal colloidal particles need to have a certain minimum size, and, in order to create sufficient index change in the material, there should be certain minimum number of these clusters.

Figure 4:
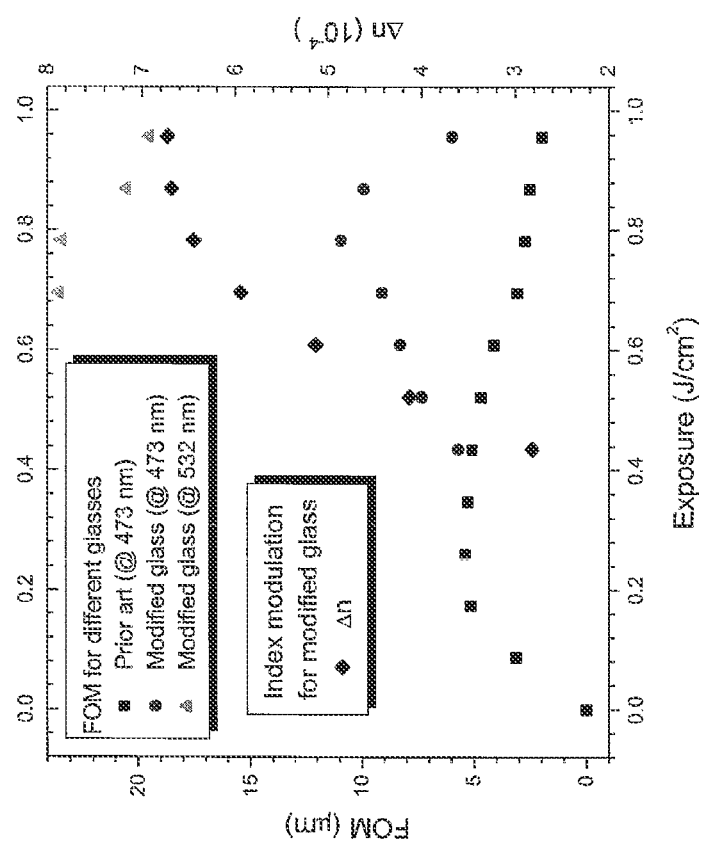
FIG. 4 is a plot of the figures of merit for an example holographic glass made with an arsenic compound, at various wavelengths of interest.

FIG. 4 provides plots of FOM for a prior art holographic glass made without arsenic, and a modified holographic glass that contains with arsenic. The FOM for the modified glass is shown for two wavelengths of interest: 473 and 532 nm. FIG. 4 also illustrates the FOM component Δn index modulation for a holographic glass made with arsenic.

FIG. 5 provides a summary table of maximum FOM for holographic glasses made with and without arsenic. The data in the table of FIG. 5 are given for three wavelengths of interest, which correspond to blue, green, and red light, respectively. As shown in both FIGS. 4 and 5, the FOM of holographic glass made with arsenic may typically be significantly higher than the FOM of holographic glass made without arsenic as measured at any of the three wavelengths of interest.

Figure 6:
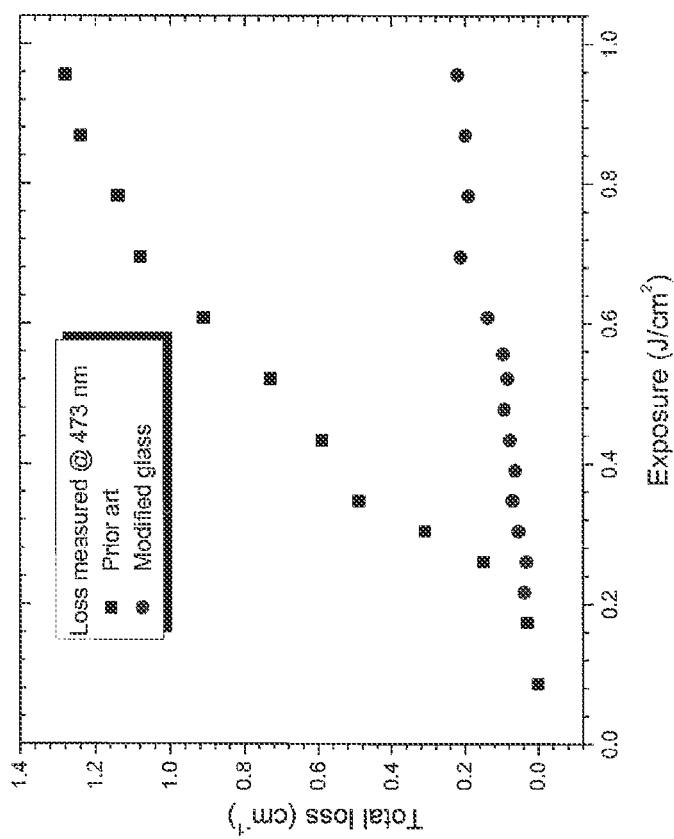
FIG. 6 is a plot of photo-induced losses in a holographic glass made with an arsenic compound at a wavelength of interest.

FIG. 6 provides plots of total optical loss as a function of radiant exposure (i.e., the surface density of radiant energy received) for an incident beam having a wavelength of 473 nm. As shown, a prior art holographic glass made without arsenic tends to exhibit significantly more total loss than a holographic glass that contains arsenic.

Figure 7:
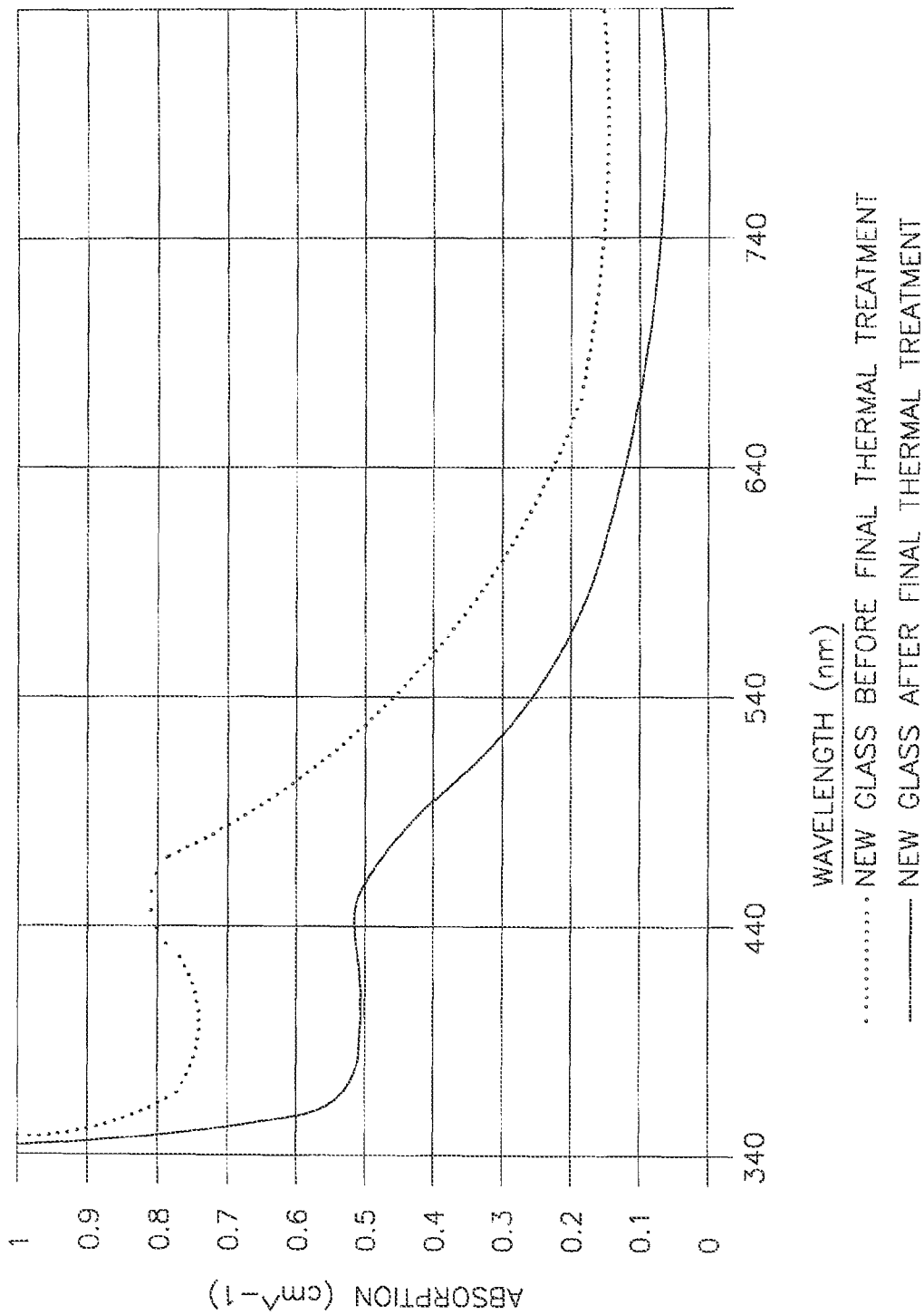
FIG. 7 is a plot of absorption in a holographic glass made with an arsenic compound, before and after final thermal treatment.

FIG. 7 depicts the absorption characteristic of a holographic glass made with arsenic before and after final thermal treatment. As seen in FIG. 7, the absorption may decrease, and, accordingly, the transparency may increase, after the final thermal treatment on a holographic glass. This suggests that the FOM of the glass may increase after final thermal treatment.

As described herein, the addition of arsenic has been shown to improve the FOM of holographic glasses, for incident light at certain wavelengths, over certain ranges of exposure. It should be understood, however, that the addition of other trace dopants may be found to similarly improve the FOM of holographic glasses. Such dopants may be identified in accordance with the methods described herein. Further, though example glasses described herein were tested for exposures up to about 1.0 J/cm$^2$, it should also be understood that holographic glasses containing arsenic as described herein may exhibit higher figures of merit than comparable prior art holographic glasses without arsenic for exposures at any level. Similarly, though example glasses described herein were tested at certain wavelengths, it should also be understood that holographic glasses containing arsenic as described herein may exhibit higher figures of merit than comparable prior art holographic glasses at any wavelength.

What is claimed is:

1. A photorefractive, holographic, silicate glass comprising silver, bromine, fluorine, an oxide of cerium, and an oxide of arsenic,
   wherein the glass has a hologram recorded therein, wherein the hologram is formed by changes in index of refraction within the glass, and
   wherein the glass has a figure of merit of at least seven microns when measured for an incident beam of light having a wavelength of 473 nanometers, wherein the figure of merit represents a ratio of photoinduced refractive index modulation to total loss coefficient.

2. The glass of claim 1, comprising at least 0.02 percent by weight of the oxide of arsenic.

3. The glass of claim 1, comprising 0.02-0.4 percent by weight of the oxide of arsenic.

4. The glass of claim 1, comprising 0.05-0.2 percent by weight of the oxide of arsenic.

5. The glass of claim 1, wherein the oxide of arsenic is $As_2O_3$.

6. The glass of claim 1, wherein the hologram comprises a Bragg grating.

7. The glass of claim 1, wherein the holographic glass is a photo-thermal-refractive glass.

* * * * *